United States Patent [19]
Lee et al.

[11] Patent Number: 5,569,532
[45] Date of Patent: Oct. 29, 1996

[54] BIAXIALLY ORIENTED POLYESTER FILM AND PROCESS FOR THE PREPARATION THEREOF

[75] Inventors: Kwang-Hyung Lee; Joon-Hee Han, both of Suwon-si; Young-Jin Lee, Anyang-si, all of Rep. of Korea

[73] Assignee: SKC Limited, Kyungki-do, Rep. of Korea

[21] Appl. No.: 305,128

[22] Filed: Sep. 13, 1994

[30] Foreign Application Priority Data

Sep. 14, 1993 [KR] Rep. of Korea ............... 1993-18475

[51] Int. Cl.$^6$ .............. B32B 5/16; B32B 27/36; B32B 27/18; C08K 3/22

[52] U.S. Cl. ............. 428/327; 428/329; 428/330; 428/480; 428/910; 524/425; 524/430; 524/601; 525/441; 525/443

[58] Field of Search ................... 428/327, 328, 428/329, 330, 480, 910; 264/210.6, 288.4, 290.2; 524/430, 437, 425, 599, 601; 525/437, 441, 443

[56] References Cited

U.S. PATENT DOCUMENTS

| | | | |
|---|---|---|---|
| 4,801,640 | 1/1989 | Dallmann et al. | 524/394 |
| 5,006,589 | 4/1991 | Sakamoto et al. | 524/430 |
| 5,023,291 | 6/1991 | Sakamoto et al. | 524/430 |
| 5,032,458 | 7/1991 | Dallmann et al. | 428/423.7 |
| 5,164,439 | 11/1992 | Sakamoto et al. | 524/425 |
| 5,252,388 | 10/1993 | Murooka et al. | 428/328 |
| 5,314,736 | 5/1994 | Kawaguchi et al. | 428/143 |
| 5,372,879 | 12/1994 | Handa et al. | 428/327 |

FOREIGN PATENT DOCUMENTS 5-279493  10/1993  Japan .

*Primary Examiner*—Paul Thibodeau
*Assistant Examiner*—Vivian Chen
*Attorney, Agent, or Firm*—Anderson, Kill & Olick

[57] ABSTRACT

A biaxially oriented polyester film having improved surface properties, scratch resistance and abrasion resistance comprises the particulate slip agents of a calcium carbonate having an average particle diameter ranging from 0.01 to 3 μm, alumina having an average particle diameter ranging from 0.005 to 3 μm and a Mohs' hardness of 8 or more and a melamine formaldehyde condensate having an average particle diameter ranging from 0.01 to 3 μm, wherein each of the slip agents is in an amount ranging from 0.01 to 4 wt. % based on the weight of the polyester.

The film is useful in manufacturing condensers, medical articles, photographic films, packaging and labelling materials and, particularly, magnetic recording media.

1 Claim, No Drawings

BIAXIALLY ORIENTED POLYESTER FILM AND PROCESS FOR THE PREPARATION THEREOF

FIELD OF THE INVENTION

The present invention relates to a biaxially oriented polyester film and, more specifically, a biaxially oriented polyester film having improved surface properties, scratch resistance and abrasion resistance; and to a process for preparing such improved polyester film.

BACKGROUND OF THE INVENTION

In general, polyesters, particularly polyethylene terephthalates, possess good chemical stability, mechanical strength, heat resistance, durability and chemical resistance; and therefore, they have been widely used in manufacturing condensers, medical articles, photographic films, packaging and labelling materials and, particularly, magnetic recording media.

In order to provide a film manufactured from such polyesters with an excellent runnability, handling property and surface properties, inorganic slip agents such as calcium carbonate, silica, alumina or kaoline are incorporated into the polyester film to form minute protuberances on the surface thereof. Among these inorganic slip agents, calcium carbonates control efficiently the surface properties of the film; and alumina provides an excellent scratch resistance to the film. However, they have a low affinity to the polyester, which may lead to the formation of voids during a draw process of the film. In a further processing of the film, such voids may cause the surface to abrade and the particles to be separated therefrom. Such a polyester film, when used as a magnetic tape, may be easily damaged.

As one of conventional methods for improving the scratch resistance of a polyester film, Japanese Patent Laid-open Publication No. 90-185533 discloses a method for improving the surface properties and scratch resistance of a polyester film by employing mixtures of a heavy calcium carbonate and alumina.

To diminish the abrasion of the polyester film caused by a lack of affinity between the polyester and the particles, Japanese Patent Laid-open Publication No. 90-11640 describes the addition of organic particles, such as silicon polyamide, crosslinked styrene-divinylbenzene copolymer, crosslinked polyester or Teflon, along with inorganic particles, such as calcium carbonate, into a polyester to produce a polyester film with improved surface properties and scratch resistance.

Although the films prepared by these methods may possess good surface properties and scratch resistance, however, they still have the problem of a low affinity between the organic and inorganic particles and to the polyester, and, therefore, the abrasion resistance may decline, allowing the particles to break away from the film on high running conditions.

SUMMARY OF THE INVENTION

Accordingly, it is an object of the present invention to provide a biaxially oriented polyester film which has improved surface properties, scratch resistance and abrasion resistance, and which has a good affinity between the slip agent particles incorporated therein and the polyester, rendering it possible to minimize the segregation of the particles even on high running conditions.

It is a further object of the present invention to provide a process for preparing a biaxially oriented polyester film which has improved surface properties, scratch resistance and abrasion resistance, and which has a good affinity between its slip agent particles and the polyester.

In accordance with one aspect of the present invention, there is provided a biaxially oriented polyester film comprising the particulate slip agents of a calcium carbonate having an average particle diameter ranging from 0.01 to 3 µm, alumina having an average particle diameter ranging from 0,005 to 3 µm and a Mohs' hardness of 7 or more and a melamine formaldehyde condensate having an average particle diameter ranging from 0.01 to 3 µm, wherein each of the slip agents is in an amount ranging from 0.01 to 4 wt. % based on the weight of the polyester.

In accordance with another aspect of the present invention, there is provided a process for preparing a biaxially oriented polyester film, which comprises incorporating in a polyester the particulate slip agents of a light calcium carbonate having an average particle diameter ranging from 0.01 to 3µm, alumina having an average particle diameter ranging from 0.005 to 3 µm and a Mohs' hardness of 7 or more and a melamine formaldehyde condensate having an average particle diameter ranging from 0.01 to 3 µm, wherein each of the slip agents is in an amount ranging from 0.01 to 4 wt. % based on the weight of the polyester; melt-extruding the resulting mixture in the form of a sheet; and biaxially extending the sheet to provide the polyester film.

DETAILED DESCRIPTION OF THE INVENTION

In accordance with the present invention, the incorporation in a film forming polyester of a calcium carbonate having an average particle diameter ranging from 0.01 to 3 µm and alumina having an average particle diameter ranging from 0.005 to 3 µm and a Mohs' hardness of 7 or more as inorganic slip agents, and a melamine formaldehyde condensate having an average particle diameter ranging from 0.01 to 3 µm as organic slip agents, in each amount of 0.01 to 4 wt. % based on the weight of the polyester, entails a marked improvement in the affinity between the slip agents and the polyester, the surface properties, scratch resistance and abrasion resistance of the film manufactured from the polyester.

Said melamine formaldehyde condensate, which is a thermosetting resin made from the condensation of melamine and formaldehyde, has a good thermal resistance at a temperature of 300° C. Addition of the melamine formaldehyde condensate together with the calcium carbonate and alumina to the polyester enhances greatly the surface conditions of the polyester film even at high temperature.

The polyester which can be employed in the present invention may comprise at least 80 mol. % of the ethylene terephthalate unit and the remainder being other units. The copolymer components for the other units may include dicarboxylic acids or oxycarboxylic acids and diols. Specific examples of the dicarboxylic acids or oxycarboxylic acids are: isophthalic acid, para-oxybenzoic acid, para-β-oxyethoxy benzoic acid, 2,6-naphthalene dicarboxylic acid, 4,4'-dicarboxyldiphenyl, 4,4'-dicarboxylbenzophenone, bis(4-carboxyldiphenyl)ethane, adipic acid, sebacic acid and 5-sodium sulfoisophthalic acid.

Representative examples of the diols are: propylene glycol, butane diol, neopentyl glycol, diethylene glycol, and cyclohexane dimethanol.

The polyester which is used in the present invention is typically polyethylene terephthalate prepared by the polycondensation of dimethyl terephthalate and ethylene glycol. The polyester can be produced via transesterification as well as direct polymerization process in a batch or continuous system.

In case that the polyester is prepared by using the transesterification process, there may be preferably employed any transesterification catalyst well known in the art, for example, alkaline earth metal compounds, e.g., magnesium, calcium and barium compounds, and zirconium, sodium, potassium, cobalt, zinc and manganese compounds.

On the other hand, in case of employing the direct polymerization process, a catalyst, preferably, an antimony, germanium or titanium compound may be used.

The calcium carbonate which is used as one of the inorganic slip agents has an average particle diameter ranging from 0.01 to 3 μm, preferably from 0.05 to 1.5 μm; and is used in an amount ranging from 0.01 to 4% by weight, preferably from 0.05 to 2%, based on the weight of the polyester.

The alumina which is used as another inorganic slip agent has an average particle diameter ranging from 0.005 to 3 μm, preferably from 0.01 to 2.0 μm; and is added in an amount ranging from 0.01 to 4% by weight, preferably from 0.05 to 2%, based on the weight of the polyester.

The melamine formaldehyde condensate which is used as an organic slip agent has an average particle diameter ranging from 0.01 to 3 μm, preferably from 0.05 to 1.5 μm; and is incorporated in an amount ranging from 0.01 to 4% by weight, preferably from 0.05 to 2%, based on the Weight of the polyester.

Further, a dispersant may be used so as to prepare an ethylene glycol slurry containing the inorganic and organic slip agent particles. Among various dispersants, acryl compounds, e.g., sodium polyacrylate, sodium methacrylate or ammonium acrylate, and benzene sulfonate compounds which are soluble in ethylene glycol may be beneficially used.

In addition to the inorganic and organic slip agent particles as described above, the polyester film of the present invention may also contain other common additives such as antioxidants, antistatic agents, heat stabilizers and dyes.

Any of the well known method, may be used in producing the polyester film of the present invention. Polyester of a molecular weight of about 20,000 containing the above-described inorganic and organic slip agent particles as well as conventional additives is melted and extruded into a cast film through a T-die, using a conventional method. This film is subsequently quenched on a cold roll, then biaxially drawn to produce a biaxially oriented polyester film. The draw process is carried out according to a conventional method; and should not be affected by the addition of the above additives. The draw process may be conducted at a temperature ranging from 60° to 150° C.; and the draw ratio may range from 2.5 to 6.0 in a longitudinal direction and from 2.5 to 6.0 in a transverse direction.

The thickness of the polyester film produced as described above may be controlled depending on the usage; and is usually in the range from 2.0 to 200 μm.

The following Examples are intended to illustrate the present invention more specifically, without limiting the scope of the invention.

In the Examples, the properties of the polyester film were evaluated in accordance with the following methods.

1. Average Particle Diameter

The average particle diameter of the organic or inorganic slip agent particles was measured as a volumetric average diameter of an ethylene glycol slurry containing the slip agents by employing a centrifugation type granulometer (SA-CP2, Shimadzu in Japan).

2. Molecular Weight

The molecular weight of the polyester was measured by way of a molecular weight measuring apparatus (150 C, Waters in U.S.A.) by using metacresol as a mobile phase at a flow rate of 1 ml/min and at a column temperature of 100° C.

3. Surface Smoothness

The surface smoothness of a 30 mm×20 mm×50 μm polyester film was determined by using a contact type surface roughness gauge(SURFCORDER SE-30D, Kosaka Institute in Japan).

Average Surface Roughness at Centerline (Ra):

The height of a line parallel to a mean line of a roughness curve, when the areas of both sides of the line become equal.

Highest Height at Centerline (Rt):

Distance from the highest point to the lowest point within the measuring area.

The lower the average surface roughness and the highest height of the film, the better the surface smoothness.

4. Abrasion resistance

The abrasion resistance of the film was determined by running a tape, which was made by slitting the film in a width of ½ inch, at a running speed of 3.3 cm/sec twice by way of a tape running tester (TBT-300F, Yokohama System Institute in Japan), and observing the degree of the formation of white powders at the surface of the guide pin with a microscope.

The abrasion resistance was evaluated on the basis of the following criteria:

A: When no white powder was formed on the surface of the guide pin.
B: When white powders were formed on 20% of the surface of the guide pin.
C: When white powders were formed on 50% of the surface of the guide pin.
D: When white powders were formed on the entire surface of the guide pin.

5. Scratch resistance

The scratch resistance of the film was measured by running a tape, which was made by slitting the film in a width of ½ inch, at a running speed of 3.3 cm/sec twice by way of a tape running tester(TBT-300F, Yokohama System Institute), and then observing the degree of the damage by scratching on the surface of the film with a microscope.

The scratch resistance was evaluated on the basis of the following criteria:

⊚: When 2 or less scratched lines were formed on the surface of the film.
○: When 3 to 4 scratched lines were formed on the surface of the film.
Δ: When 5 to 6 scratched lines were formed on the surface of the film.
x: When 7 or more scratched lines were formed on the surface of the film.

EXAMPLES 1 TO 4

7500 g of dimethyl terephthalate and 4780 g of ethylene glycol were first transesterified in a continuous reactor, in the presence of 0.0224% by weight of zinc acetate and 0.0404% by weight of calcium acetate as the transesterification catalyst, and in the presence of a melamine formaldehyde condensate as an organic slip agent and a calcium carbonate as an inorganic slip agent, in which the slip agents have an average particle diameter specified in Table I, respectively, and are added in an amount specified in Table I, respectively. Separately, alumina of an average particle diameter specified in Table I was mixed in an amount specified in Table I with 4 times by weight of ethylene glycol in a homogenizer and the resulting mixture was stirred at a high speed to give an ethylene glycol slurry. Then, this slurry was again transesterified with the first transesterification products and the resulting product was polycondensed in the presense of 0.0444% by weight of antimony trioxide as the polymerization catalyst to give a polyester polymer of a molecular weight of about 20,000.

Thereafter, the polymer thus obtained was melt-extruded through a T-die of a conventional process to form a sheet. The sheet was extended in a draw ratio of 3.0 in longitudinal and transverse directions at 90° C. to provide a biaxially oriented polyester film having the thickness of 50 μm.

The properties of the film were measured and are presented in Table I.

COMPARATIVE EXAMPLES 1 TO 9

The procedures of Examples 1 to 4 were repeated except that instead of the mixture of the inorganic and organic slip agents, a calcium carbonate or alumina alone, or a mixture of a calcium carbonate and alumina was employed in an amount specified in Table I.

The properties of the film were measured and are shown in Table I.

TABLE I

| | Slip agent | | | Properties of the film | | | | |
| --- | --- | --- | --- | --- | --- | --- | --- | --- |
| | | | | Molecular weight Number of | Surface smoothness | | | |
| | | Average diameter (μm) | Amount (%) | average molecular weight (Mn) | Average surface roughness at centerline (Ra: μm) | Highest height at centerline (Rt: μm) | Abrasion resistance | Scratch resistance |
| Ex. | | | | | | | | |
| 1 | calcium carbonate + Alumina + Melamine formaldehyde condensate | 0.40/0.10/0.28 | 0.30/0.25/0.15 | 18,100 | 0.041 | 0.545 | A | ○ |
| 2 | calcium carbonate + Alumina + Melamine formaldehyde condensate | 0.54/0.20/0.70 | 0.20/0.20/0.20 | 18,500 | 0.043 | 0.733 | A | ⊙ |
| 3 | calcium carbonate + Alumina + Melamine formaldelyde condensate | 0.65/0.30/1.10 | 0.15/0.15/0.25 | 18,300 | 0.055 | 1.058 | A | ⊙ |
| 4 | calcium carbonate + Alumina + Melamine formaldehyde condensate | 1.45/0.40/1.55 | 0.10/0.10/0.14 | 17,700 | 0.069 | 1.328 | B | ○ |
| Com. Ex. | | | | | | | | |
| 1 | calcium carbonate | 0.40 | 0.30 | 16,600 | 0.049 | 0.598 | D | × |
| 2 | calcium carbonate | 0.54 | 0.20 | 17,600 | 0.053 | 0.757 | D | × |
| 3 | calcium carbonate | 0.65 | 0.15 | 18,300 | 0.063 | 0.815 | D | × |
| 4 | Alumina | 0.10 | 0.25 | 17,800 | 0.046 | 0.754 | D | △ |
| 5 | Alumina | 0.20 | 0.20 | 17,300 | 0.054 | 0.796 | C | △ |
| 6 | Alumina | 0.30 | 0.15 | 18,500 | 0.069 | 0.887 | D | △ |
| 7 | calcium carbonate + Alumina | 0.40/0.10 | 0.30/0.25 | 19,100 | 0.053 | 0.620 | D | △ |
| 8 | calcium carbonate + Alumina | 0.54/0.20 | 0.20/0.20 | 19,300 | 0.063 | 0.780 | D | ○ |
| 9 | calcium carbonate + Alumina | 0.65/0.30 | 0.15/0.15 | 18,100 | 0.069 | 1.262 | D | ○ |

*
⊙: excellent
○: good
△: fair
×: poor

As shown in Table 1, the biaxially oriented polyester film of the present invention exhibits excellent surface smoothness and also improved scratch resistance and abrasion resistance. From the result, it is understood that in accordance with the present invention, by employing a specific inorganic and organic slip agents together, a polyester film having outstandingly improved properties even at a high temperature, compared to those of the film made by using inorganic slip agents alone or a mixture thereof can be prepared.

While the invention has been described in connection with the above specific embodiments, it should be recognized that various modifications and changes may be made within the scope of the invention as defined by the claims that follow.

What is claimed is:

1. A biaxially oriented polyester film comprising 0.1 to 0.3% by weight of calcium carbonate particles having an average particle diameter ranging from 0.4 to 1.45 μm, 0.1 to 0.25% by weight of alumina particles having an average particle diameter ranging from 0.1 to 0.40 μm and a Mohs' hardness of 7 or more and 0.14 to 0.25% by weight of melamine formaldehyde resin particles having an average particle diameter ranging from 0.28 to 1.55 μm.

* * * * *